United States Patent
Porter (10) Patent No.: US 7,455,304 B2
(45) Date of Patent: Nov. 25, 2008

(54) TELEPHONE QUICK DIALING AND RE-DIALING

(76) Inventor: Swain W. Porter, 12511 89th Ct. NE., Kirkland, WA (US) 98034

( * ) Notice: Subject to any disclaimer, the term of this patent is extended or adjusted under 35 U.S.C. 154(b) by 86 days.

(21) Appl. No.: 10/931,834

(22) Filed: Sep. 1, 2004

(65) Prior Publication Data

US 2005/0025304 A1  Feb. 3, 2005

Related U.S. Application Data

(62) Division of application No. 09/816,563, filed on Mar. 23, 2001, now Pat. No. 6,856,816.

(51) Int. Cl.
*H04M 1/00* (2006.01)

(52) U.S. Cl. .................................... 279/355

(58) Field of Classification Search ..... 379/352–357.01
See application file for complete search history.

(56) References Cited

U.S. PATENT DOCUMENTS

| | | | | |
|---|---|---|---|---|
| 4,550,224 | A * | 10/1985 | Winchell | 379/202.01 |
| 5,268,959 | A | 12/1993 | Hong | |
| 5,455,858 | A | 10/1995 | Lin | |
| 5,625,682 | A * | 4/1997 | Gray et al. | 379/207.16 |
| 5,805,694 | A | 9/1998 | Kim | |
| 5,825,871 | A * | 10/1998 | Mark | 379/357.03 |
| 5,917,904 | A * | 6/1999 | Theis | 379/355.08 |
| 6,073,005 | A * | 6/2000 | Raith et al. | 455/404.1 |
| 6,285,753 | B1 * | 9/2001 | Slusher | 379/355.06 |
| 6,292,557 | B1 * | 9/2001 | Gabara | 379/355.08 |
| 6,310,948 | B1 * | 10/2001 | Nemeth | 379/213.01 |
| 6,330,311 | B1 * | 12/2001 | Mijares et al. | 379/112.01 |
| 6,360,108 | B1 | 3/2002 | Rogers | |
| 6,370,136 | B1 * | 4/2002 | Silva et al. | 370/352 |
| 6,373,940 | B2 * | 4/2002 | Shaffer et al. | 379/355.02 |
| 6,477,240 | B1 * | 11/2002 | Lim et al. | 379/67.1 |
| 6,721,418 | B1 * | 4/2004 | Yun | 379/355.01 |
| 6,760,432 | B1 * | 7/2004 | Wong et al. | 379/356.01 |
| 6,775,538 | B2 * | 8/2004 | Forbes et al. | 455/414.1 |
| 6,891,944 | B1 * | 5/2005 | Smith | 379/221.14 |
| 7,113,585 | B1 * | 9/2006 | Breckenridge | 379/356.01 |
| 2006/0002542 | A1 * | 1/2006 | Yamartino | 379/355.08 |

FOREIGN PATENT DOCUMENTS

GB  2 296 158 A  6/1996

* cited by examiner

*Primary Examiner*—Ramnandan Singh
(74) *Attorney, Agent, or Firm*—Schwabe, Williamson & Wyatt, P.C.

(57) ABSTRACT

A telephone is equipped to enable a user to enter a dialing prefix, an append indicator, and a dialing request to quickly place a call to a callee from a location where calling the callee requires the dialing prefix. In response, the telephone places the call to the callee using the dialing prefix and a last placed call number. In an alternate embodiment, a previous dialed number may be used instead. In yet other embodiments, the telephone detects for a dialing error, using voice recognition technology, and either re-places the call or facilitates re-placement of the call in a corrected manner. In one embodiment, the telephone is a wireless mobile phone; in another, the telephone is a wired or cordless telephone handset.

17 Claims, 7 Drawing Sheets

\* Voice Recognition Logic (Optional)

TELEPHONE QUICK DIALING AND RE-DIALING

CROSS-REFERENCES TO RELATED APPLICATIONS

This application is a divisional application of U.S. application Ser. No. 09/816,563, filed Mar. 23, 2001 now U.S Pat. No. 6,856,816.

BACKGROUND OF THE INVENTION

1. Field of the Invention

The present invention relates to the field of telephony. More specifically, the present invention relates to the quick dial and re-dial features of telephones.

2. Background Information

Advances in integrated circuit, microprocessor, networking, and telecommunication technologies have led to wide spread adoption of computers, fax machines, as well as wireless mobile client devices, in particular, wireless mobile telephones. Modern powerful and yet inexpensive computers coupled with high speed communication accesses allow even the average users to access the World Wide Web, exchange emails with one another, participate in instant messaging or on-line chats, and engage in e-commerce. Wireless mobile phones offer the advantage of enabling their users to be communicatively reachable by their business associates, friends and family members, wherever the users may be, as long as they are within the reach of the service networks. With the cost of ownership continues to decline, even non-professionals including teenagers are increasingly dependent on their wireless mobile phones to meet their communication needs.

As a result of this explosive adoption of telephony enabled computing/communication devices, there has been a significant increase in the need for telephone numbers, leading to the introduction or division and formation of new calling areas (with each of the new calling areas having its own new "area code"). In turn, more and more metropolitan areas require ten digits dialing, even for "local" calls.

In the meantime, as advances in technology and competition continue to drive down the cost of ownership, including the offering of one rate calling plan, for both local and long distance calls (for at least the 48 contiguous states), and support of multiple protocols (e.g. for both U.S. and European calling), more and more users, especially business users who travel frequently to "away: locations, use their wireless mobile phones as their primary communication devices, taking and placing calls from their "home" as well as "away" locations.

To facilitate ease of dialing, most wireless mobile phones as well as many wired or cordless conventional telephone sets offer the feature of quick dialing using any one of a number of saved phone numbers, typically the most frequently called numbers, such as a user's home number, office number and so forth. However, in many instances, users still wind up dialing other infrequently called numbers. With increased mobility (dialing from "away" locations), and dialing areas requiring 10-digit local dialing, often users would fail to dial with the proper prefixes. Typically, the user is provided with an audio error message reminding the user to dial with certain requisite dialing prefix. This feedback or reminder often aggravates the user, as the system appears to know what's wrong with the number dialed, but does not automatically repair the incorrect dialing format.

Thus, an improved approach that supports the increased mobility, and changing dialing behavior of telephone users, providing these users with enhanced usability and calling experience, is desired.

SUMMARY OF THE INVENTION

A telephone is equipped to enable a user to enter a dialing prefix, an append indicator, and a dialing request to quickly place a call to a callee from a location where calling the callee requires the dialing prefix. In response, the telephone places the call to the callee using the dialing prefix and a last placed call number. In an alternate embodiment, a previous dialed number may be used instead.

In yet other alternate embodiments, the telephone detects for a dialing error, using voice recognition technology, and either re-places the call or facilitates re-placement of the call in a corrected manner.

These features are especially useful to a user who has made an error in placing the call in a calling format without including the required dialing prefix.

In one embodiment, the telephone is a wireless mobile phone; in another, the telephone is a wired or cordless telephone handset. In yet other embodiments, the "telephone" is a personal digital assistant incorporated with a telephony module, or a computing device incorporated with telephony facilities.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described referencing the illustrated embodiments. However, it will be apparent to those skilled in the art that the present invention may be practiced with alternate embodiments including only some or all aspects of the present invention. In particular, the present invention will be described referencing wireless mobile phone embodiments. However, it will be apparent to those skilled in the art that the present invention may be practiced with wired or cordless telephone handsets. The present invention may also be practiced with personal digital assistants incorporated with telephony modules, or computing devices, such as laptop or desktop computers, incorporated with telephony facilities.

For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. The phrase "in one embodiment" will be used repeatedly, however the phrase does not necessarily refer to the same embodiment, although it may.

Figure 1:
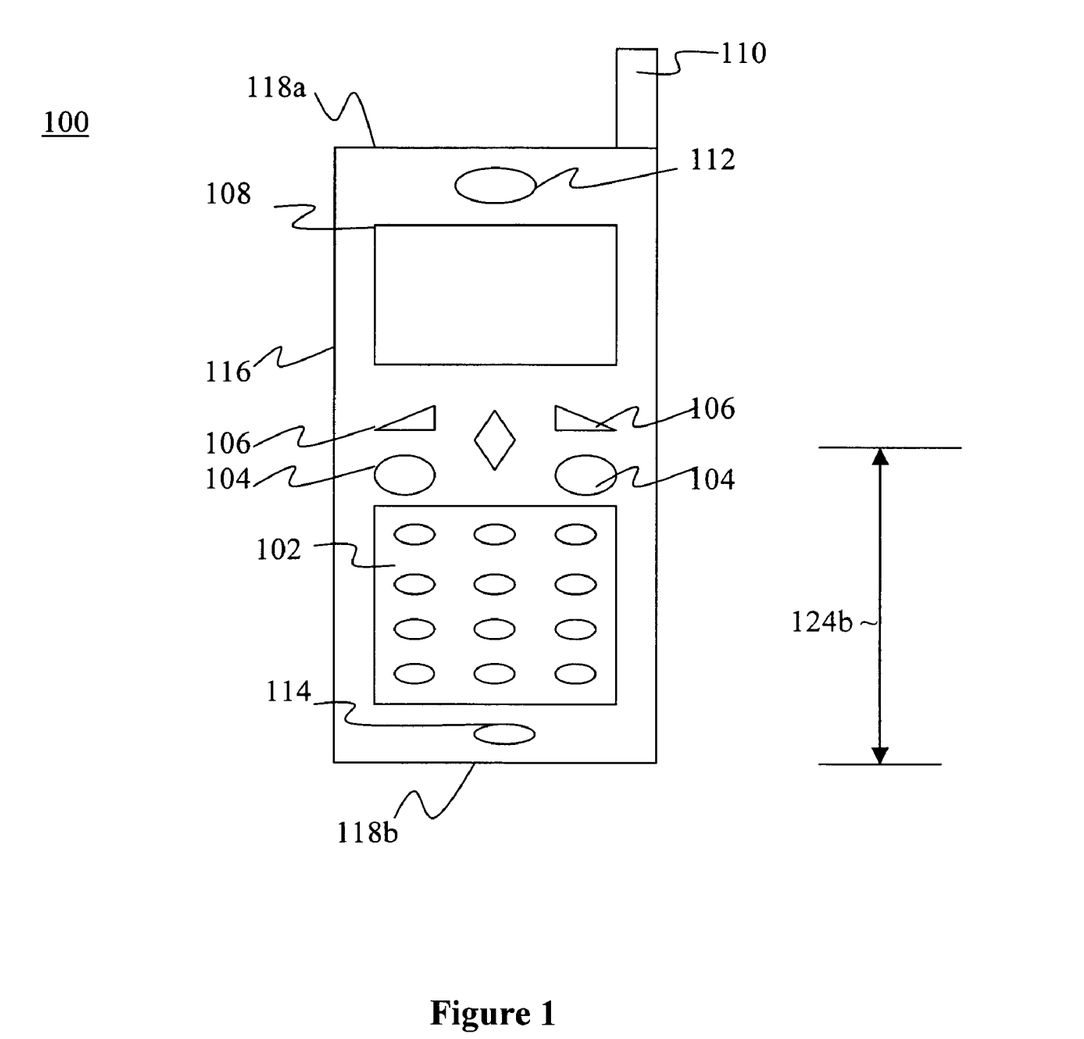
FIGS. 1-2 illustrate two front views of two wireless mobile phones suitable for use to practice the present invention, in accordance with two embodiments.
Figure 2:
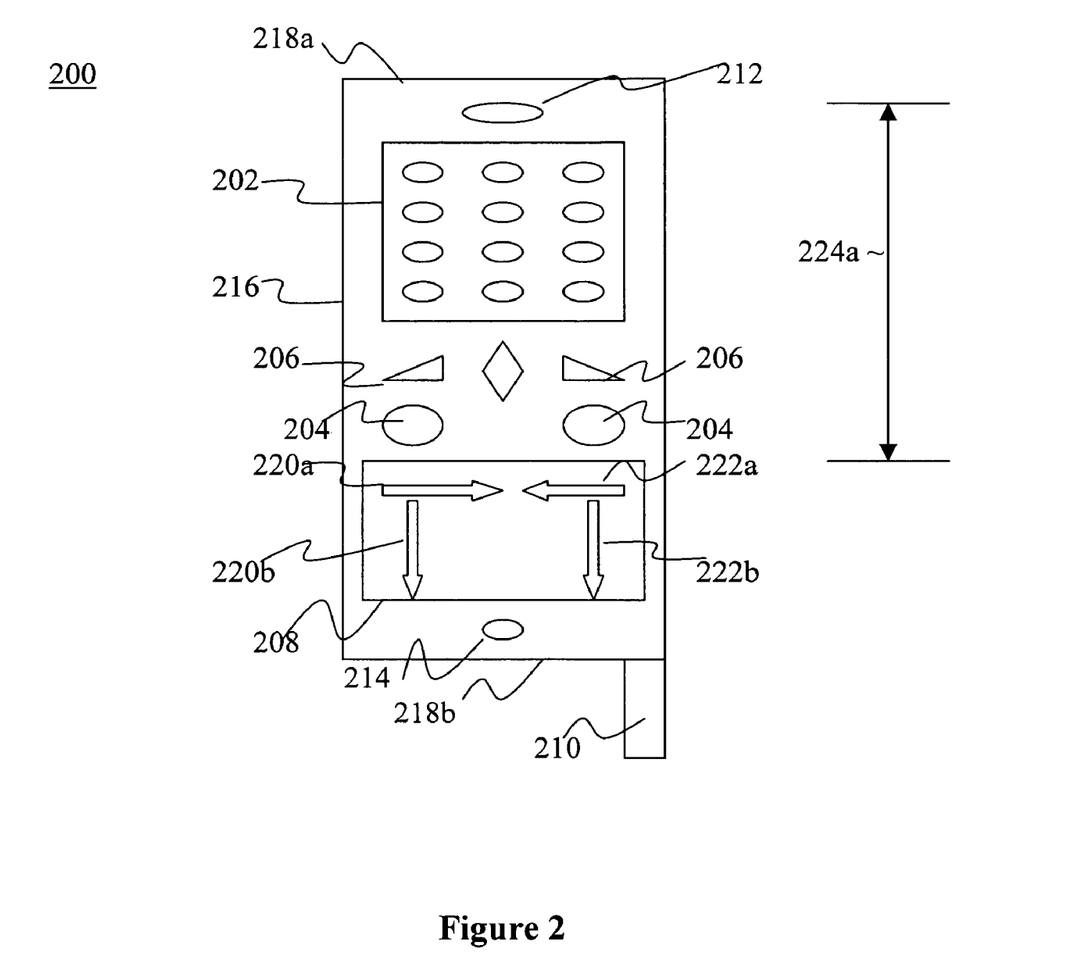
Figure 3:
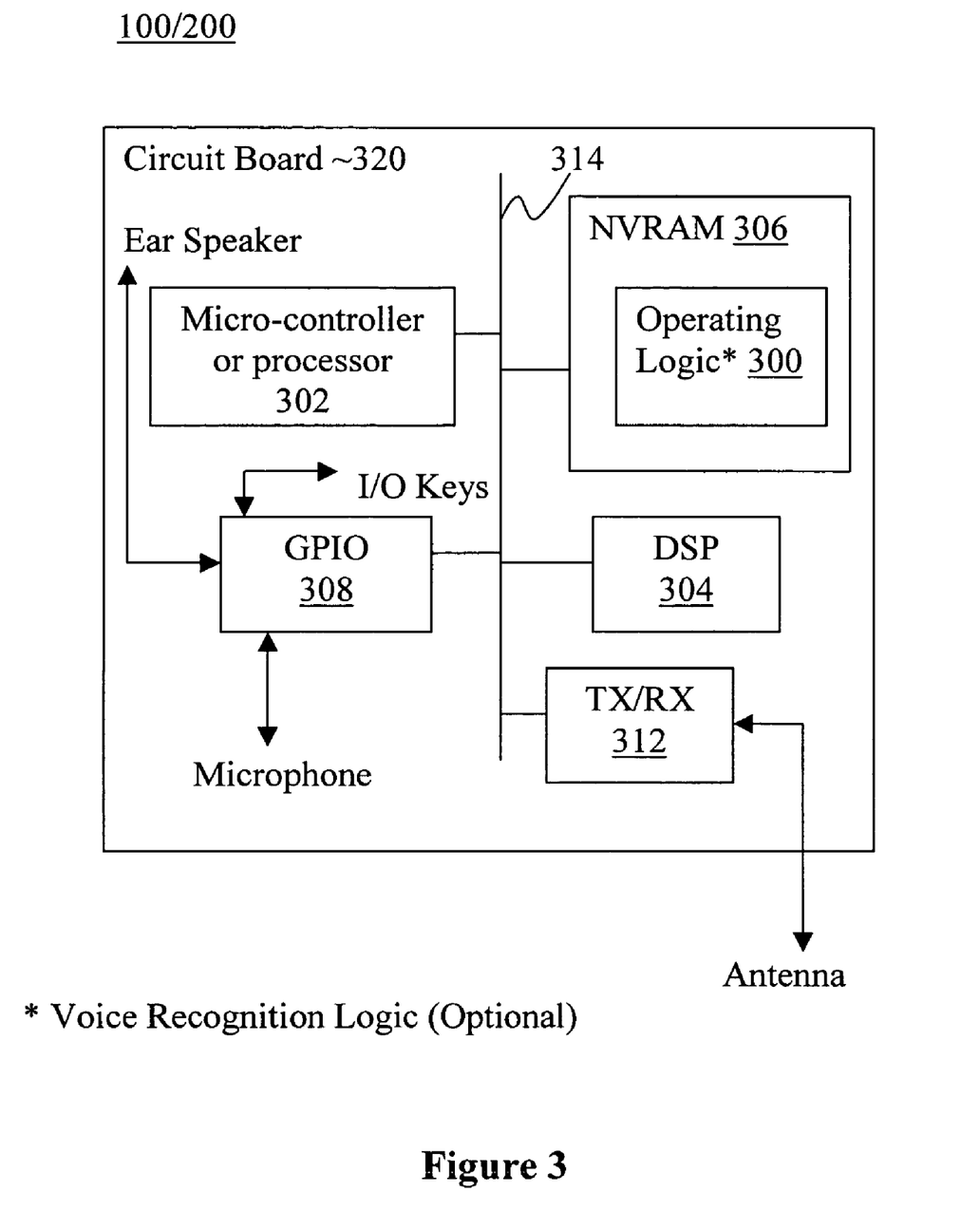
FIG. 3 illustrates an internal component view of the wireless mobile phones of FIGS. 1-2, in accordance with one embodiment.

Referring now to FIGS. 1-3, wherein two front views of two wireless mobile phones 100 and 200, in accordance with two embodiments, and an internal component view of wireless mobile phone 100/200, in accordance with one embodiment, suitable for use to practice the present invention, are shown. As will be described in more detail below, operating logic 300 (FIG. 3) of phone 100/200 are incorporated with the teachings of the present invention to allow a user to quickly dial or re-dial a callee in a "corrected" calling format, to enhance the usability and usage experience of phone 100/200. Typically, the "corrected" calling format is a calling format, requiring certain dialing prefix, including possibly the need of a country and/or an area code. In one embodiment, these enhancements to operating logic 300 include voice recognition logic to detect incorrect dialing, and facilitate automatic re-dialing with the corrected dialing format.

For the illustrated embodiments, phone 100/200 includes body casing 116/216, display 108/208, standard input key pad 102/202 having a number of conventional alphanumeric keys, "talk" and "end talk" buttons 104/204, cursor control buttons 106/206, antenna 110/210, ear speaker 112/212, and microphone 114/214. Alphanumeric keys include in particular a number of special character keys, such as the "*" key and the "#" key (not explicitly identified).

Internally, wireless mobile phone 100/200 includes elements found in conventional mobile client devices, such as micro-controller/processor 302, digital signal processor (DSP) 304, non-volatile memory 306, general purpose input/output (GPIO) interface 308, and transmit/receive (TX/RX) 312 (also known as transceiver), coupled to each other via bus 314 and disposed on a circuit board 320.

Except for the enhancements provided to operating logic 300, and usage of one or more of the alphanumeric keys as "append key or keys", to be described more fully below, the enumerated elements perform their conventional functions known in the art. In particular, the alphanumeric keys are employed to enter e.g. dialing prefix or prefixes, such as the long distance dialing prefix "1", a country code or an area code dialing prefix. Cursor control buttons 106/206 are employed to interact with various menu options and selection of list elements, including selection of a phone number from a list of saved phone numbers. "Talk" button 104/204 is employed to initiate or place a call. Beside employed to store operating logic 300, non-volatile memory 306 is also employed to store a number of working data, including a last dialed phone number. TX/RX 312 is employed to transmit and receive signals. TX/RX 312 may support one or more of any of the known signaling protocols, including but are not limited to CDMA, TDMA, GSM, and so forth. The constitutions of these elements are known, and will not be further described. As to operating logic 300, it may be implemented in the assembly or machine instructions of processor 302, or a high level language that can be compiled into these assembly or machine languages. Voice recognition logic if included may employ any one of a number of voice recognition techniques known in the art.

Accordingly, except for the enhancements provided, phone 100/200 otherwise represents a broad range of wireless mobile phones, including both the analog as well as the digital types (of all signaling protocols). The two embodiments differ in the relative disposition of antenna 110/210 to ear speaker 112/212, and the relative disposition of keypad 102/202 to display 108/208. In the first embodiment, similar to conventional prior art wireless mobile phones, antenna 110 and ear speaker 112 are both disposed near top end 118a, whereas in the second embodiment, unlike conventional prior art wireless mobile phones, antenna 210 is disposed near bottom end 218b while ear speaker 212 is disposed near top end 218a. Further, in the first embodiment, similar to conventional prior art wireless mobile phones, keypad 102 is disposed in the lower half 124b of phone 100 beneath display 108, whereas in the second embodiment, unlike conventional prior art wireless mobile phones, keypad 202 is disposed in the upper half 224a of phone 200 above display 208. In other words, except for enhanced operating logic 300 of the present invention, the first embodiment represents a wide range of wireless mobile phones known in the art. Similarly, except for enhanced operating logic 300 of the present invention, the second embodiment is disclosed in co pending application 09/767,526, filed on Jan. 22, 2001, entitled "A Wireless Mobile Phone with Inverted Placement of Antenna and Keypad", which is hereby fully incorporated by reference.

Note that, a device such as wireless mobile phone 100/200 having display 108/208 necessarily has a reading orientation. By definition, the surface the display is disposed is the front surface. The front surface in turns definitively defines the left side surface, the right side surface, and top and bottom ends 118a/218a and 118b/218b. For example, textual data are either rendered from left to right and top to bottom, as denoted by arrows 220a and 220b, as in the case of the English language, or right to left and top to bottom, as denoted by arrows 222a and 222b, as in the case of the Hebrew language, or top to bottom and right to left, as denoted by arrows 220b and 222a, as in the case of the Chinese language. Thus, the manner in which textual data are rendered definitively defines which end is the top end, and which end is the bottom end.

Figure 4:
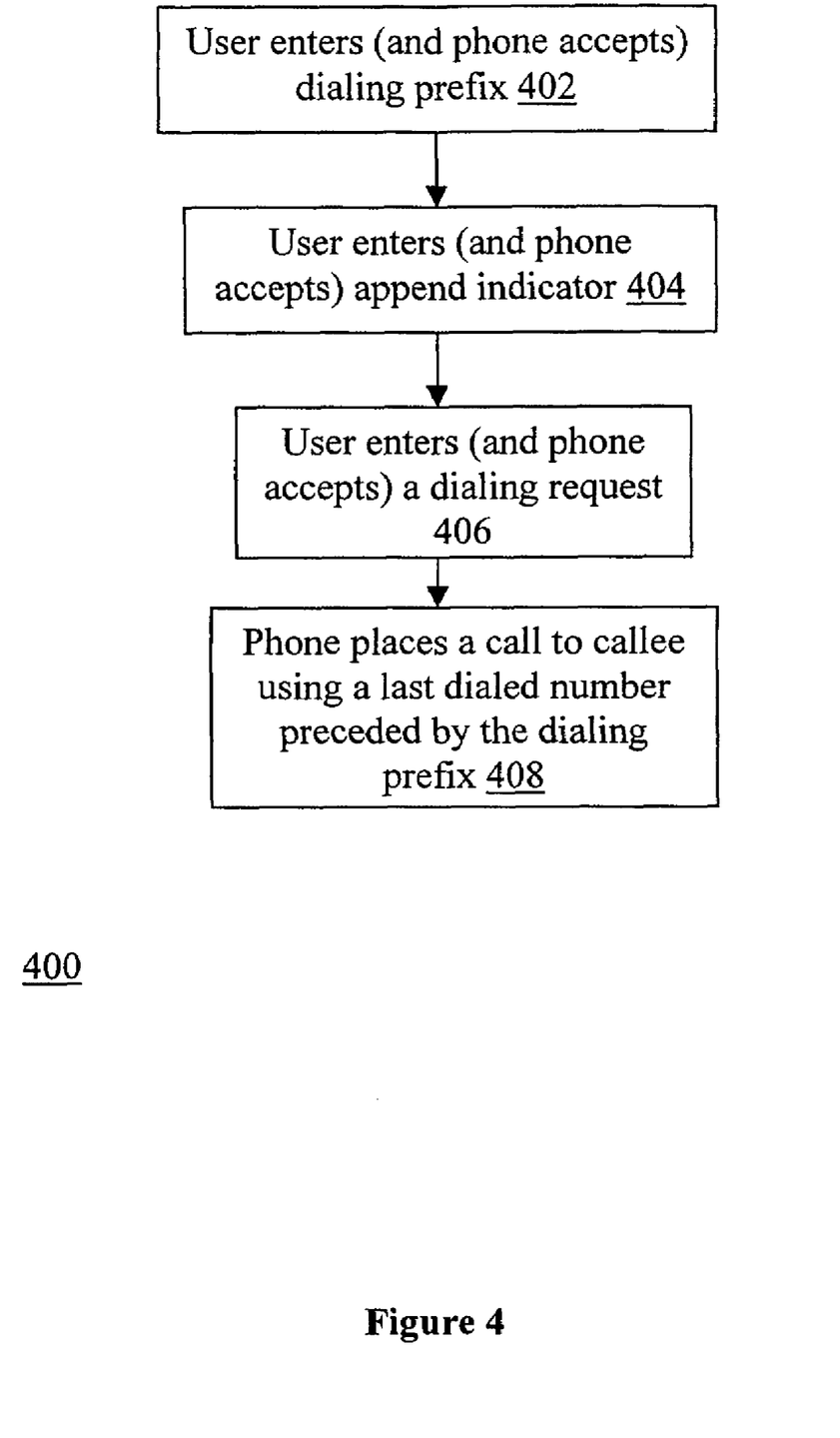
FIG. 4 illustrates a first aspect of the method of the present invention, in accordance with two embodiments.

Referring now to FIG. 4, wherein a block diagram illustrating the operating flow 400 of a first aspect of the method of the present invention, is shown. As illustrated, in accordance with the first aspect of the method of the present invention, a user enters (and phone 100/200 accepts) a dialing prefix, block 402. As alluded earlier, in addition to e.g. the long distance dialing prefix "1" or "011", the dialing prefix may further include a country and/or an area code. At block 404, the user further enters (and phone 100/200 accepts) an append indicator. In one embodiment, the "#" key is employed as the append indicator. In another embodiment, the "*" key is employed instead. In yet other embodiments, other "special" character or dedicated function key may be used instead.

Thereafter, for this first aspect, at block 406, the use enters (and phone 100/200 accepts) a dialing request. In one embodiment, the user makes the dialing request using e.g. the "Talk" button 104/204. In response, phone 100/200, more specifically, operating logic 300, places a call to a callee using a last dialed phone number, preceded by the earlier entered dialing prefix, block 408.

Accordingly, under this first aspect, a user may easily and quickly correct his/her mistake, and re-places a call to a callee using the last dialed phone number, but in an alternate "extended" dialing format, including a dialing prefix.

Figure 5:
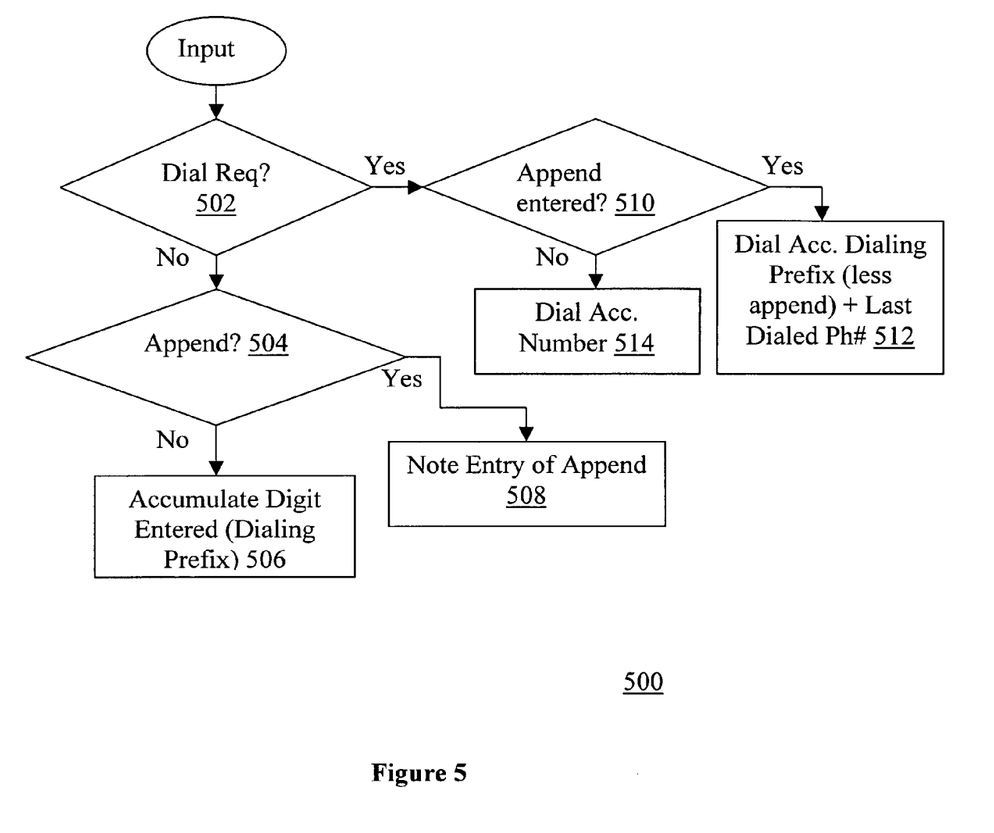
FIG. 5 illustrates the operational flow of the relevant aspects of the operational logic of FIG. 3 in support of the first aspect of the method of FIG. 4, in accordance with one embodiment.

FIG. 5 illustrated the operating flow 500 of the relevant aspects of operating logic 300 in support of this first aspect of the present invention, in accordance with one embodiment. As illustrated, upon receipt of an user input, operating logic 300 determines if the input is a dialing request, block 502. If not, operating logic 300 determines if the input is an append indicator, block 504. If not, the entered digit is accumulated as part of a dialing prefix being formed, block 506.

Eventually, as earlier described, the user enters an append indicator. At such time, the result of the determination at block 504 is affirmative. If so, operating logic 300 notes the entry of the append indicator, block 508. Similarly, eventually the user enters a dial request. At such time, the result of the determination at block 502 is affirmative. If so, operating logic 300 further determines if the append indicator was previously entered, block 510. If so, operating logic 300 causes a call to be placed to a callee using the last dialed phone number, preceded by the entered dialing prefix, block 512, as described earlier for the first aspect of the method of the present invention. If not, operating logic 300 causes a call to be placed to a callee using the accumulated numbers without augmenting the accumulated numbers, block 514.

In alternate embodiments, operating logic 300 may additionally support an extended version of append, allowing append of any previously dialed number. The support may be implemented for example by supporting append indicators having different append meanings, e.g. "*" for appending the last dial, and "#" for appending any previously dialed number. For these embodiments, at block 404, an additional operation of facilitating the user in selecting a previously dialed number as the dial number to append will be performed. Operationally, at block 504, instead of merely noting an append request has been entered, operating logic 300 further determines if the append indicator is for appending the last dialed number or any previous dialed number. If it is the former, the re-dialing process continues as earlier described. On the other hand, if the it is the later, operating logic 300 displays the contents of the dialed number logs, and facilitate the user in selecting one of the previously dialed number, before continuing with the re-dialing process as described.

Figure 6:
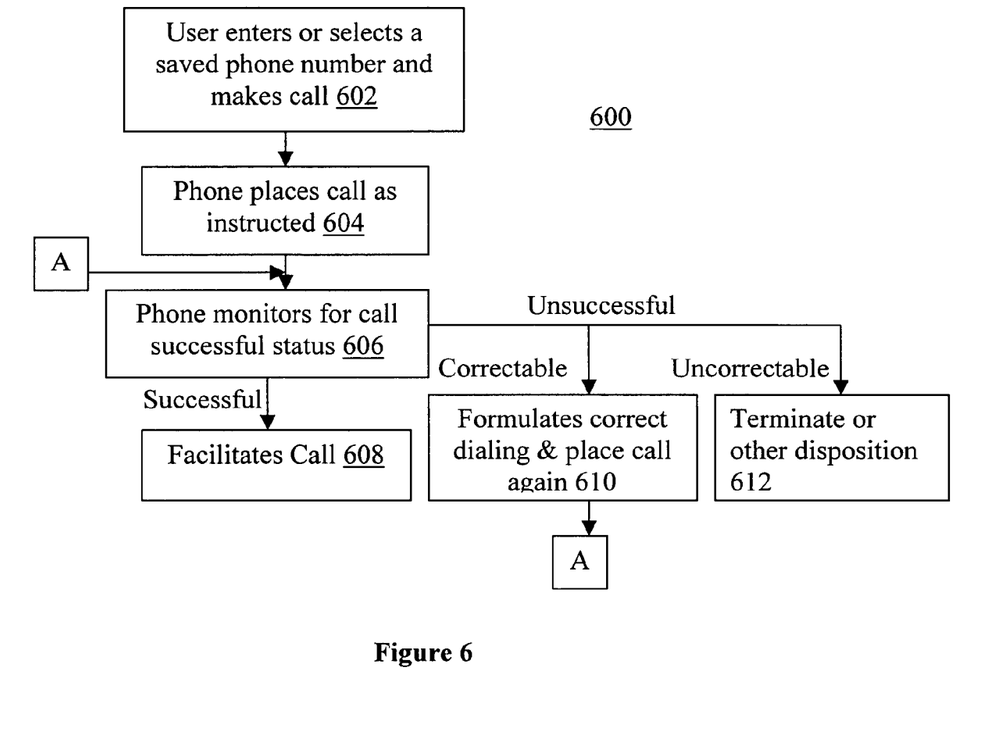
FIG. 6 illustrates a second aspect of the method of the present invention, in accordance with one embodiment.

Referring now to FIG. 6, wherein a block diagram illustrating the operating flow 600 of a second aspect of the method of the present invention, in accordance with one embodiment, is shown. For the illustrated embodiment, it is assumed that operating logic 300 includes voice recognition logic that recognizes at least a number of pre-determined audio error messages. As illustrated, in accordance with the second aspect of the method of the present invention, a user enters or selects a save phone number, and places a call, block 602. Phone 100/200 places the call accordingly, block 604. Thereafter, operating logic 300 equipped with voice recognition logic, monitors for a "call successful" status, block 606. More specifically, operating logic 300 monitors the audio signal to determine if placement of the call has resulted in one of the recognizable error conditions. That is, whether placement of the call, e.g. as a result of the failure to include the requisite dialing prefix has resulted in the receipt of a recognizable audio error response. If placement of the call was successful, e.g. as denoted by the absence of any of the recognizable audio error responses (for a predetermined monitor period) or origination of audio signal (i.e. the user starts to speak), phone 100/200 facilitates the successfully established call, block 608. On the other hand, if the call is unsuccessful, and the error, as discerned from the recognizable audio error responses, is correctable, operating logic 300 terminates the incorrect call, formulates the correct dialing (e.g. by including the appropriate dialing prefix per the recognized audio error response) and places the call again, block 610. Thereafter, the process continues back at block 606. In one embodiment, the formulation may include prompting the user for an appropriate country and/or area code. In one embodiment, the correction and re-placement of the call are made automatically, whereas, in another embodiment, the correction and re-placement of the call are made upon prompting the user for approval. Preferably, the manner of corrective response may be user selectable through configuration options (as other conventional operation options). If the call is unsuccessful, and the error, being undiscernable from the recognizable audio error responses, is uncorrectable, operating logic 300 terminates the incorrect call, and disposes the error condition in any one of a number of application dependent manners, block 612. Accordingly, a user may be provided with automatic assistance when the user makes an error and places a call in an incorrect dialing format, e.g. by failing to include the proper dialing prefix.

Figure 7:
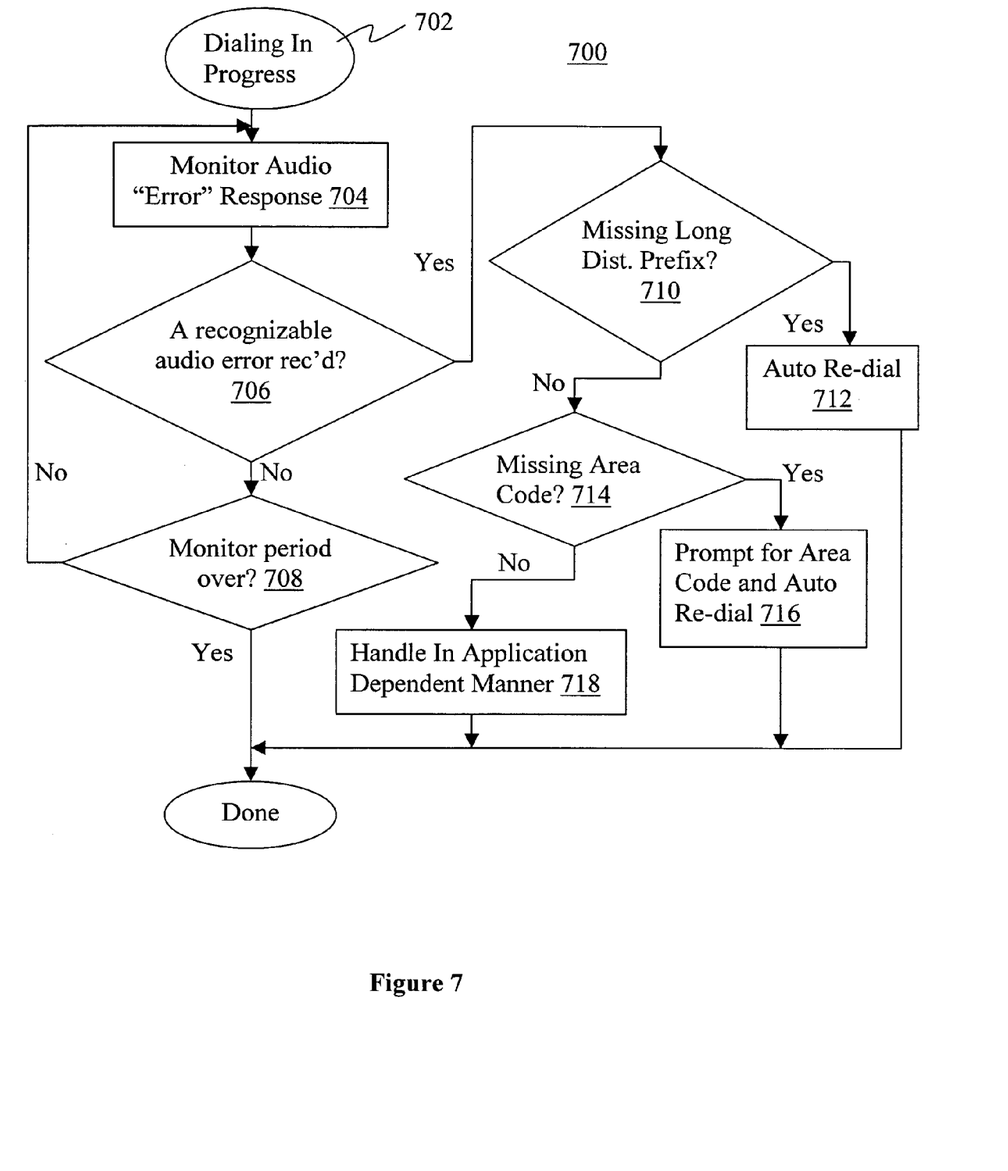
FIG. 7 illustrates the operational flow of additional relevant aspects of the operational logic FIG. 3 in support of the second aspect of the method of the present invention, in accordance with one embodiment.

FIG. 7 illustrates an operational flow 700 of the relevant aspects of operating logic 300 in support of the third aspect of the method of the present invention, in accordance with one embodiment. As illustrated, upon detecting a call is being placed 702, i.e. dialing in progress, operating logic 300 monitors for audio error response, block 704, and determined if a recognizable audio error response has been received, block 706. The process is repeated continuously, until a predetermined monitoring period has elapsed, block 708 (and no recognizable audio error response has been received).

Back at block 706, if a recognizable error response is detected, operating logic 300 further determines if the error is limited to the absence of a required long distance dialing prefix, block 710. If so, assuming the "auto re-dial" configuration has been pre-selected, operating logic 300 terminates the incorrect call, formulates the correct dialing format, and re-places the call, block 712. On the other hand, if the error includes the absence of a required area code, block 714, operating logic 300 terminates the incorrect call, prompts the user for the required area code, formulates the correct dialing format, and re-places the call, block 716. Otherwise, the incorrect call is disposed of in any one of a number of application dependent manners, block 718.

Thus, a method and apparatus enabling a telephone user to quickly dial or re-dial a call in an alternate dialing format has been described. As suggested earlier, while the present invention has been described in terms of the above-illustrated embodiments, those skilled in the art will recognize that the invention is not limited to the embodiments described. The present invention can be practiced with modification and alteration within the spirit and scope of the appended claims. In particular, the present invention, with minor modifications that are well within the ability of those ordinarily skilled in the art, may be practiced on wired or cordless telephone handsets. Likewise, the present invention may be practiced on personal digital assistants incorporated with telephony modules or computing devices, such as laptop or desktop computers, incorporated with telephony facilities. Thus, the description is to be regarded as illustrative instead of restrictive on the present invention.

What is claimed is:
1. A method comprising:
placing, by a mobile device, a first call to a phone number;
receiving, by the mobile device, in return audio error signals resulting from placing the first call;
determining, by the mobile device, if the first call has failed for missing a required dialing prefix by analyzing the received audio error signals;

terminating, by the mobile device, the first call if it is determined that the first call has failed; and placing, by the mobile device, a second call using the same phone number preceded with the missing required dialing prefix based at least in part on the analysis of the received audio error signals.

2. The method of claim 1 wherein the dialing prefix comprises a long distance calling prefix.

3. The method of claim 1, further comprising monitoring, by the mobile device, the first call by monitoring the received audio error signals; and wherein said determining comprises analyzing said received audio error signals to determine if a first of one or more audio dialing error messages was received.

4. The method of claim 3, wherein said method further comprises identifying, by the mobile device, the missing required dialing prefix based on said first audio dialing error message received.

5. The method of claim 1, wherein the missing required dialing prefix includes at least a missing area code, and said method further comprises prompting, by the mobile device, a user to provide said missing area code.

6. The method of claim 1, wherein the second call is placed automatically based on the analysis of said received audio error signals.

7. The method of claim 1, wherein the second call is placed after obtaining approval from a user to place the second call.

8. The method of claim 1, wherein said placing a first call to a phone number comprises placing a first call with at least a transceiver, and wherein said receiving audio error signals resulting from placing the first call comprises receiving audio error signals using at least said transceiver.

9. A mobile device comprising:

a processor; and logic to be operated by the processor to enable the mobile device to place a first call to a phone number, receive in return audio error signals resulted from placing the first call, determine if the first call has failed for missing a required dialing prefix by analyzing the received audio error signals, terminate the first call if it is determined that the first call has failed, and place a second call using the same phone number preceded with the missing required dialing prefix based at least in part on the analysis of said received audio error signals.

10. The mobile device of claim 9, wherein the dialing prefix comprises a long distance calling prefix.

11. The mobile device of claim 9, wherein the logic is further to enable the mobile device to monitor the first call by monitoring the received audio error signals, and to analyze said received audio error signals to determine if a first of one or more audio dialing error messages was received.

12. The mobile device of claim 11, wherein the logic is further to enable the mobile device to identify the missing required dialing prefix based on said first audio dialing error message received.

13. The mobile device of claim 9, wherein the logic is further to enable the mobile device to prompt a user to provide a missing area code, when the missing required dialing prefix includes at least a missing area code.

14. The mobile device of claim 9, wherein the mobile device is a selected one of a wireless mobile phone, a wired handset, a cordless handset, a personal digital assistant incorporated with a telephony module, and a computing device equipped with telephony facilities.

15. The mobile device of claim 9, wherein the logic is further to enable the mobile device to place the second call automatically based on the analysis of said received audio error signals.

16. The telephony apparatus of claim 9, wherein the logic is further to enable the mobile device to place the second call after obtaining approval from a user to place the second call.

17. The mobile device of claim 9, wherein the logic is further to enable the mobile device to place a first call with at least a transceiver, and receive audio error signals using at least said transceiver.

\* \* \* \* \*